United States Patent [19]

Friedman

[11] Patent Number: 4,935,907

[45] Date of Patent: Jun. 19, 1990

[54] ELECTRONIC HOMING SYSTEM

[76] Inventor: Mark B. Friedman, 5537 Darlington Rd., Pittsburgh, Pa. 15217

[21] Appl. No.: 158,555

[22] Filed: Feb. 22, 1988

[51] Int. Cl.⁵ ............................................. G01S 3/80
[52] U.S. Cl. .................................. 367/118; 367/910; 342/24
[58] Field of Search .................. 367/2, 910, 118, 197, 367/199; 342/24, 44; 340/572, 407, 825.54, 870.09

[56] References Cited

U.S. PATENT DOCUMENTS

| 3,357,020 | 12/1967 | Slifer, Jr. |
| 3,805,265 | 4/1974 | Lester . |
| 3,898,619 | 8/1975 | Carsten et al. ................. 340/825.54 |
| 4,156,136 | 5/1979 | Strum et al. ............................ 367/2 |
| 4,466,125 | 8/1984 | Kanayama . |
| 4,510,495 | 4/1985 | Sigrimis et al. . |
| 4,598,272 | 7/1986 | Cox . |
| 4,598,275 | 7/1986 | Ross et al. . |
| 4,649,385 | 3/1987 | Aires et al. ...................... 367/199 X |
| 4,656,463 | 4/1987 | Anders et al. . |
| 4,656,476 | 4/1987 | Tavtigian . |

Primary Examiner—Thomas H. Tarcza
Assistant Examiner—Tod Swann
Attorney, Agent, or Firm—Webb, Burden, Ziesenheim & Webb

[57] ABSTRACT

A homing system for directing the user to one of a plurality of objects and/or locations comprises a plurality of remote modules and a mobile module. The remote modules transmit an uncoded nondirectional response signal after receiving a coded request signal. The mobile module at spaced intervals transmits coded nondirectional request signals. The mobile module generates internal representation of the distance between the receiving means and the selected module from the time measured between the transmission of the request signal and the receipt of the response signal.

8 Claims, 4 Drawing Sheets

Fig. 9

ELECTRONIC HOMING SYSTEM

BACKGROUND OF THE INVENTION

The general concept of transmitting interrogating signals to coded objects and receiving coded or uncoded response signals is taught in U.S. Pat. Nos. 3,357,020; 3,805,265; 4,510,495; 4,466,125; 4,598,272; 4,598,275; 4,656,463; and 4,656,476. In U.S. Pat. No. 4,656,463 a system utilizing both passive and active transceivers is disclosed. Also, both electromagnetic (EMR) and ultrasound signals and Doppler effect ranging are disclosed. In U.S. Pat. No. 3,805,265 a radiant wave electronic locating system in which room sensors and a central console are linked by radiant energy signals is disclosed. The signals are coded and transmitted from the central console to track, locate or page a particular individual.

It is an object according to this invention to provide a system to help individuals with sensory deficiencies (e.g., blind or low vision) or mental confusion to find their way to desired objects or locations. It is a further object according to this invention to provide a system to remind an individual to get something (e.g., medicine) and to assist the individual in locating it. It is a further object of this invention to provide a system for directing a mobile robot with local object avoidance capability to a desired object or location.

SUMMARY OF THE INVENTION

A homing system for directing the user (human or mobile robot) to one of a plurality of objects and/or locations according to this invention comprises remote modules associated with objects or locations and a mobile module. In the case of a human user, the mobile module may be held in the hand. In some embodiments, the system further includes repeaters and/or danger modules.

The remote modules are placed with objects or at locations to which the system user may desire to be led. The remote modules comprise means for transmitting an uncoded nondirectional response signal. The remote modules have a selector or tuner such that each is provided a unique signal processing characteristic, for example, the remote modules may be selected to respond to a request signal having particular pulse train configuration.

The mobile module comprises circuitry and transducers for, at spaced intervals, transmitting coded, nondirectional request signals. The mobile module comprises at least one transducer for receiving a response signal from a selected one of the plurality of remote modules initiated by said spaced request signals.

Typically, the mobile unit is designed to be hand held and has a handle. A programed digital microchip computer generates an internal representation of the distance between the receiving transducer and the selected remote module from the time measured between the transmission of a request signal and the receipt of a response signal. The computer compares subsequent representations of the distances to determine if the mobile module is moving closer to or farther away from the selected remote module. The mobile module includes an indicator for indicating to the user whether the distance to the selected remote module is increasing or decreasing as the mobile module is moved. The mobile module further comprises an input scheme such as a keypad for selecting one of said remote modules based upon its unique signal processing characteristic by coding the request signal therefor.

Preferably, a plurality of sonic receivers for receiving sonic response signals are provided on the mobile module. Two sonic receivers may be provided spaced along one face of the mobile module. More desirably, three non-collinear sonic receivers are spaced apart and fixed to the mobile module. The computer is then programed for generating an internal representation of the direction (relative to the orientation of the mobile module) to the source of the response signal from the difference in time of receipt of the return signal by each spaced transducer and/or by the knowledge as to which transducer first received the signal.

At least one of the response and request signals is an ultrasonic signal because the speed of sound is slow enough to enable the easy electronic measurement of times for the ultrasonic signals to travel between the mobile and remote modules. While both the response and request signals may be ultrasonic signals, it is preferred that one be an ultrasonic and the other be an electromagnetic radiation signal (EMR signal). This reduces the potential for confusion from reflections and decreases the time required for a round trip of the request and response signals without diminishing the ability to accurately detect differences in distances. For those embodiments detecting the direction from which the response signal comes to the mobile module, it is essential that the response signal be an ultrasonic signal. According to one preferred embodiment, the request signal is an infrared EMR signal and the response signal is an ultrasonic signal.

The indicator for indicating to the user whether the distance to the selected remote module is increasing or decreasing and, optionally, the direction to the device (selected module or nearest active repeater) from which the reply signal is coming, may comprise a speaker for making an audible signal, a light display for making a visible signal, or a vibrator for generating a tactile signal.

Those systems used over more than one room include at least one repeater comprising transducers for receiving said request and/or response signals and retransmitting said signals. Most preferably, the repeater comprises two sonic sensors and means for disabling repetition of a sonic signal in one direction for a short time after a sonic pulse has been received from the other direction and two EMR sensors and means for comparing the intensity of the signals simultaneously received and for a short time thereafter disabling repetition of an EMR signal in the direction from which the higher intensity signal was received.

According to one specific embodiment of this invention, danger modules respond to all request signals and generate a response signal which can be differentiated from response signals returned from remote modules. The repeaters do not repeat the danger signals. When the danger module is within a preselected range, the mobile module generates a warning output.

DESCRIPTION OF THE PREFERRED EMBODIMENTS

Figure 1:
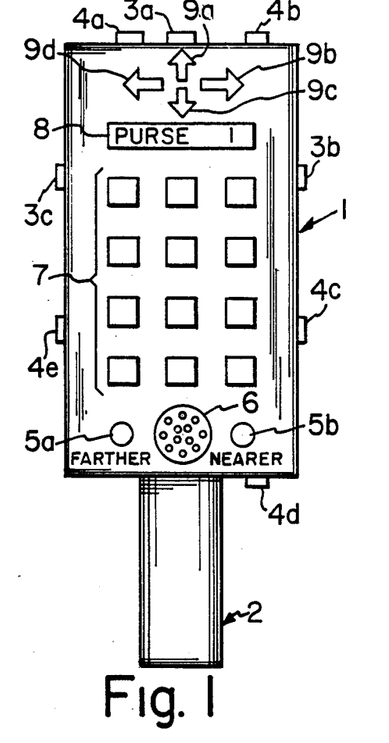
FIG. 1 is a plan view of a hand-held mobile module according to this invention.

Referring to FIG. 1, there is shown a hand-held mobile module according to one embodiment of this invention. From the body 1 of the module extends a handle 2. On the sides of the module are located the infrared transducers 3a, 3b, and 3c for emitting coded infrared signals. Also, on different faces of the module are sonic transducers 4a, 4b, 4c, 4d and 4e for receiving the sonic return signals. On the face of the module are LEDs 5a and 5b for indicating whether the user is getting nearer or farther from the source of the response signals as the user moves. A speaker 6 can also be used for this task. The keypad 7 enables the selection of a remote module to be found and the alpha-numeric display 8 enables confirmation of the selection. LEDs 9a, 9b, 9c, and 9d enable indication of the direction the user should move in order to approach the source of the response signal.

In the case where the mobile module is to be associated with a mobile robot, the mobile module is provided with a serial and/or parallel input/output port for down-loading instructions from the computer controlling the robot and up-loading the nearer-farther information and the direction to the source of the response signal information and the danger warnings to the computer controlling the robot.

Figure 2:
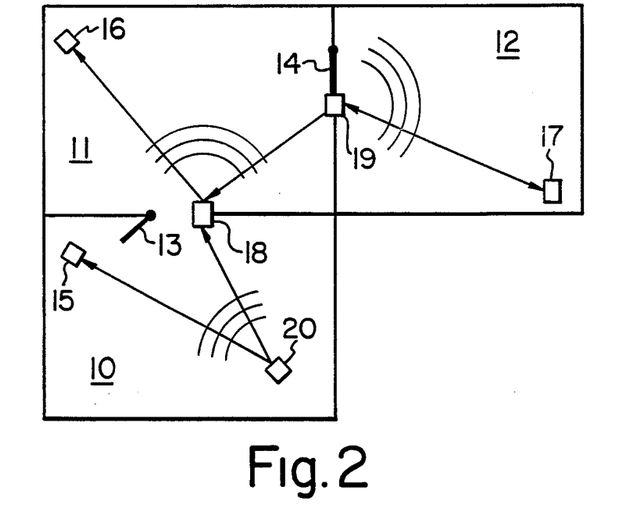
FIG. 2 is a plan view of a dwelling to illustrate the arrangement of the various components of a homing system according to this invention.

Referring now to FIG. 2, there is shown the floor plan of a dwelling with three rooms 10, 11, and 12. Doorways 13 and 14 connect the three rooms. Door 13 is shown open and door 14 is shown closed. The dwelling forms no part of this invention and is simply exemplary of one environment in which the homing system according to this invention may be used.

Remote modules 15, 16, and 17 are positioned in each of the rooms. Repeaters 18 and 19 are positioned in each doorway. The repeaters are organized to function whether or not the doors are open or closed. An individual holding a mobile module 20 is shown in room 10. If the mobile module 20 is coded to locate the remote module 17 in room 12 it will transmit a coded EMR signal, say an infrared of selected frequency which will not pass through the walls. The mobile module transmits the infrared signal in a wide arc. Since the user holds the mobile module, the users body would naturally limit the arc over which the infrared signal is transmitted. Any remote module that is within the arc of the infrared signal and not screened by a wall may be activated to respond to the signal. It is likely that the infrared signal will reach an infrared sensor via reflections from walls or ceiling which is discussed hereafter. The remote module will only respond if the code imposed upon the infrared signal is correct. In the case of FIG. 2, the remote modules 15 is not activated since the infrared signal does not carry the code to which is has been programmed to respond. Each repeater within the arc over which the infrared signal pulse is transmitted and which is not screened by walls responds to all infrared signals, however coded, to retransmit the coded infrared signal into the next room.

In the example of FIG. 2, the repeater 18 retransmits into room 11. As with remote module 15 in room 10, remote module 16 in room 11 is not activated. However, repeater 19 is activated to retransmit the coded infrared signal into room 12 notwithstanding the door is closed. Since remote module 17 is coded to respond to the infrared signal, it is activated and transmits an uncoded nondirectional ultrasonic signal which is repeated by repeaters 19 and 18 in that order. The mobile transmitter 20 receives the ultrasonic signal and calculates the time it took between transmission of the infrared signal and return of the ultrasonic signal.

More specifically, the mobile module emits an infrared signal comprising short pulse trains at spaced intervals. For example, the pulse trains may be spaced one to three tenths of a second apart. Likewise, the remote modules emit signals comprising a short duration pulse train. As the user with the mobile module moves, the round trip time (or distance) for the infrared and ultrasonic signals changes. With current implementations, the distance to the return signal source can be resolved to one twentieth of a foot. The mobile module produces an output that indicates that the time is becoming shorter or longer so that the user will continue to advance in the proper direction.

Even if the user were totally blind, he would have a general understanding of the floor plan and would advance through any door to which he had been directed. In the example of FIG. 2, upon emerging from door 13 into room 11, the mobile sensor would directly activate the repeater 19 directing the user to door 14. The user would advance into room 12 and be directed toward the remote module 17. At very short range, say less than about 1 meter, the change in round trip times becomes so short as to be somewhat difficult to interpret. It is preferred that once the mobile module determines that it is within this very short range it will instruct the remote module to send a visible and/or audible signal that the user can trace. For the embodiment wherein the direction to the source of the response signal is displayed, the very short range problem is much less likely and the visible or audible signal from the remote module is not necessary.

The mobile module can be programmed to interpret the round trip time data over long and short periods to avoid potential confusion. For example, if over a period of several seconds the average time is becoming longer, the fact that the time between the last several pulses is shorter will not be used to indicate that the user is traveling in the correct direction.

The mobile module may be provided with spaced ultrasound receivers. The return ultrasound pulse will reach one receiver before the others. This information (the difference in time between receipt of the ultrasonic pulse at each sensor) can be used to provide a signal to the user indicating the direction of the source of the response signal.

According to a preferred embodiment, the request signal comprises an infrared pulse train coded, for example, by the spacing between pulses. For example, an initial infrared pulse train may alert the remote sensors to an incoming request signal and after proper decoding, initiate the return of a response signal comprising ultrasonic pulses.

Figure 3A:
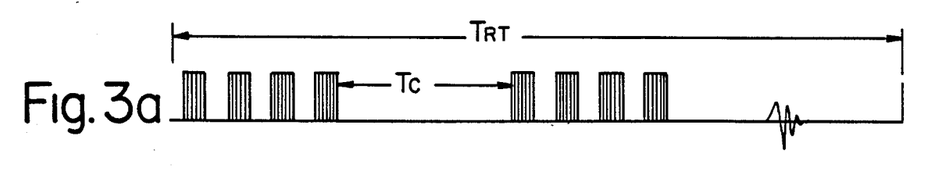
FIGS. 3a, 3b and 3c show the pulsed wave forms of the request, response and danger signals, respectively, for one embodiment of this invention.
Figure 3B:
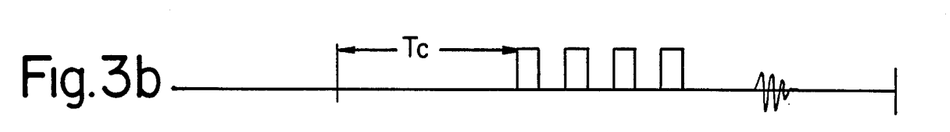

Referring to FIG. 3a, there is shown a pulsed signal at the output of a mobile module in which the output transducer is an infrared diode (EMR wavelength of about 940 nanometers). The pulses in the pulsed signal train have a frequency of 40 kilohertz and comprise a first 4 to 12 pulse burst followed by a second 4 to 12 pulse burst. The time Tc between bursts is used to code the request signal. Other coding schemes are possible, for example, the first burst might be encoded by omission of pulses as with the serial transmission of ASCII code. The second burst may be used to clock the sonic return pulses as shown in FIG. 3b. The return burst is uncoded. The time Trt represents the time for the round trip of the request and response signals.

Figure 4:
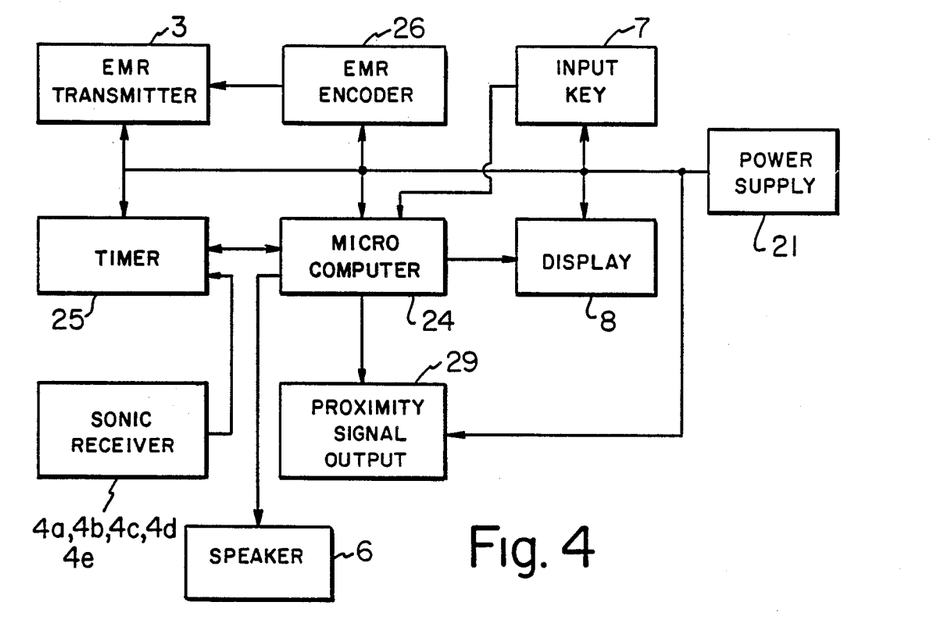
FIG. 4 is a schematic diagram of a circuit for a mobile module according to this invention.

The overall functional organization of a mobile module is shown diagramatically in FIG. 4. A power supply 21, such as a battery power supply, provides energy to all other functions. This battery may be recharged by connecting the mobile module to a recharging device, for example, without significant inconvenience. Thus, conservation of energy in the mobile module is not particularly critical. The mobile module has a keypad 7 or similar input scheme for selecting the desired remote module. The selection may be by entry of alpha-numeric codes, by use of icons associated with keys, or even by use of menus displayed on the display 8 which may, for example, be a LED or liquid crystal alpha-numeric display. In any event, the selection should be confirmed upon the display or by voice output. Most preferably, the keypad and the alpha-numeric display are interfaced with a microcomputer 24, for example, a one chip CMOS microcomputer having a microprocessor and associated RAM and ROM memory. Associated with the microcomputer is either a hardware or software timer 25 for establishing the interval between output infrared pulses and for measuring the times between the sending of the infrared pulses and the receipt of the ultrasound pulses.

The infrared output pulses are coded by the EMR encoder 26 (which may be hardware or software). The output elements 3a, 3b, 3c of the EMR transmitter may simply be an infrared emitting diode. The ultrasound receivers 4a, 4b, 4c, 4d and 4e are transducers, for example, piezoelectric transducers. The proximity signal (closer-farther signal) output 29 may be by any number of devices, for example, diodes 5a, 5b the flashing frequency, intensity or selection of which change to indicate the closing upon the return signal source, a speaker 6 (emitting a tone signal the pitch of which changes to indicate closing) or speech or even a tactile output comprising a mechanical vibrator in the handle 2 of the module. The amplitude and frequency of the vibrator may change to indicate closing.

Figure 5:
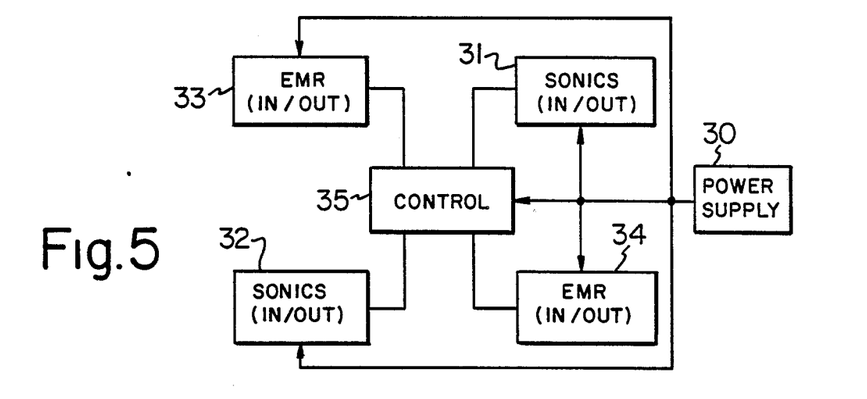
FIG. 5 is a schematic diagram of a circuit for a repeater according to this invention.

Referring to FIG. 5, there is shown the overall functional arrangement of the repeaters according to one embodiment of this invention. The repeater described with reference to FIG. 5 repeats both of the EMR and ultrasonic signals. Other embodiments are contemplated wherein only one or the other type of signal need be repeated. The power supply 30 supplies energy to the remaining portions of the circuit. It may comprise a rechargeable battery and may have associated therewith a charger that is powered by room light, for example. Since the recharging of the battery for the repeaters may be a matter of some inconvenience, the repeaters are designed to be energy efficient and, more preferably, rechargeable from ambient sources of energy. The repeater comprises two sonic transducers 31, 32 capable of receiving and transmitting sonic signals which transducers are directed in opposite directions. The repeaters have infrared sensors 33 and 34 facing in opposite directions each with an associated infrared transmitter. The control portion 35 is connected to all of the input/output elements 31, 32, 33 and 34 of the repeater. A problem with the repeaters is that a sonic signal coming from either direction will activate either sonic transducer and that, due to reflections, an infrared signal coming from either direction may activate both infrared sensors. Of course, the sensor facing the source of the incoming sonic signal will be activated a split second before the other. Thus, the control 35 must disable repetition in one direction for a short period immediately following receipt of an ultrasonic pulse from that direction to prevent self-oscillation of the repeater. The infrared reaches each transducer substantially simultaneously as the infrared travels at the speed of light. However, the transducer facing the source of the infrared signal will receive a signal of higher intensity. Thus, the control 35 must compare the intensities of the signals received at both sensors and disable repetition in the direction from which the strongest signal was received for a short period thereafter to prevent self-oscillation.

Another technique for preventing self-oscillation of the ultra sound portions of the repeaters is to disable the repetition of ultra sound in one direction for a short period of time after an EMR signal has been received and repeated in that direction.

Figure 6:
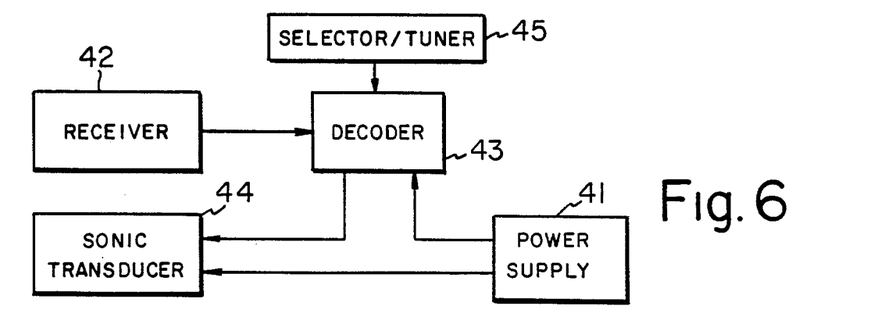
FIG. 6 is a schematic diagram of a circuit for a remote module according to this invention.

Referring to FIG. 6, the remote modules have a power supply 41 that serves all other functions. It is most desirable that this power supply be rechargeable from ambient energy sources such as room light since the continual recharging of the batteries in the remote modules may be a matter of some considerable inconvenience. The module is provided with an EMR receiver 42 which passes an amplified signal to the decoder 43. The decoder must have means for setting the code to which the remote module will respond. This comprises a selector/tuner 45. The output of the remote module is an ultrasound transducer 44.

Figure 3C:
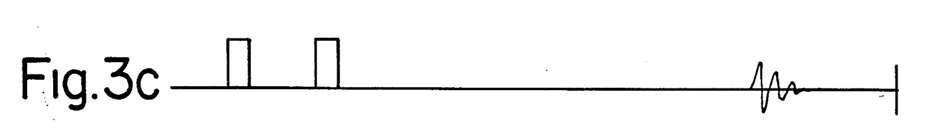

A danger module is very similar to the remote module as shown in FIG. 6. It does not require a decoder or selector/tuner since all request signals are responded to. The response signal generated by the danger module must be distinguishable from the uncoded response signals generated by the remote modules. The response signals must also not interfere with response signals from the remote modules. For example, the danger modules might be organized to return ultrasonic pulses at one half the frequency of those generated by the remote modules. The sonic pulses might also be returned during the first burst of EMR signals from the mobile module (See FIG. 3c). If the minimum time Tc (see FIGS. 3a and 3b) is long enough, the danger signal will never interfere with a signal from a remote module. Moreover, if the repeaters are organized not to repeat ultrasonic signals for the minimum period Tc danger signals will not be repeated.

In the homing system according to this invention, it is not essential that actual distances to remote modules be detected. Thus, the various modules do not require precision timing and the relay time of the repeaters is not critical as long as it is consistent in time. The change in elapsed time alone is used to guide the user to the desired remote module.

Consider that the hand-held mobile module may have a pocket calculator like display (or a speech output in the case where the user cannot read a calculator like display). Say the user selects the remote module indicating the location of the medicine cabinet. A distance readout of 6.7 meters would be useless. However, if as the user approaches the remote module a higher tone beep is issued when the distance to the medicine cabinet is reduced and a lower tone beep is issued when the distance is increased, the user can be guided to the medicine chest.

As mentioned earlier, the infrared signal pulses may bounce off several walls before striking the remote module for which the signal pulse is encoded or a repeater. Since the photo sensor is selected to have a wide angle, it will integrate energy reflected to it from several directions. For EMR pulses in the kilohertz and megahertz range the receiver will receive the signal from several directions without being confused as to the encoding.

The output of the mobile module may be computer generated speech. Two established techniques are synthetic algorithmic speech and compressed stored speech. The use of computer speech output enables the output to the mobile module to be a talking keyboard for the blind or nonreader. Since the heart of the mobile module is a microcomputer, it can have numerous functions associated with the main purpose of the homing system. It may be additionally programed as a digital watch preprogramable to issue alarms and instructions, say, for the taking of medicine. The code for the remote module at the medicine chest or refrigerator would be automatically inputted to the mobile module.

Since the remote modules will be lost to the user if their power runs out, some system is essential to maintaining them energized. One solution is to provide the modules with the ability to alert the mobile module at the time it is being activated that it is in need of recharging. Another solution is recharging from ambient energy sources such as room light via photocells. It may be possible to use the same photocells used for detecting the EMR signal pulses for charging the batteries. If the EMR is a radio frequency signal (and this involves great care since radio frequency signals are very carefully regulated by the government), the receiving antenna of the remote module may be used for both signal detection and power reception from a broadcast source.

A prototype of the homing systems described herein has been constructed using currently available technology. The microchip computer used in the prototypes is a Motorola 68HC11. For the EMR sensors, photo diodes with a wide dynamic range have been used in the remote modules and the repeaters. Photo cells that are dc coupled to charge the batteries and ac coupled to receive the signal might also be used. The decoder in the remote modules has been implemented with a time out circuit and comparators. The time out period Tc is set for each remote module. If a second pulse train is received just at the end of the time out period the remote module has been selected. Specific alternatives comprise passive LRC circuits, RC circuits, and digitally implemented CMOS active filters comprising integrated circuits. The ultrasound transmitters have been activated in two ways: either one high voltage single pulse is applied to the piezoelectric crystal or, preferably, a series of lower voltage pulses are applied to the crystal to excite its resonant frequency.

The computer program stored in RAM memory for controlling the operation of the homing system may be organized in an almost unlimited number of ways.

Figure 7:
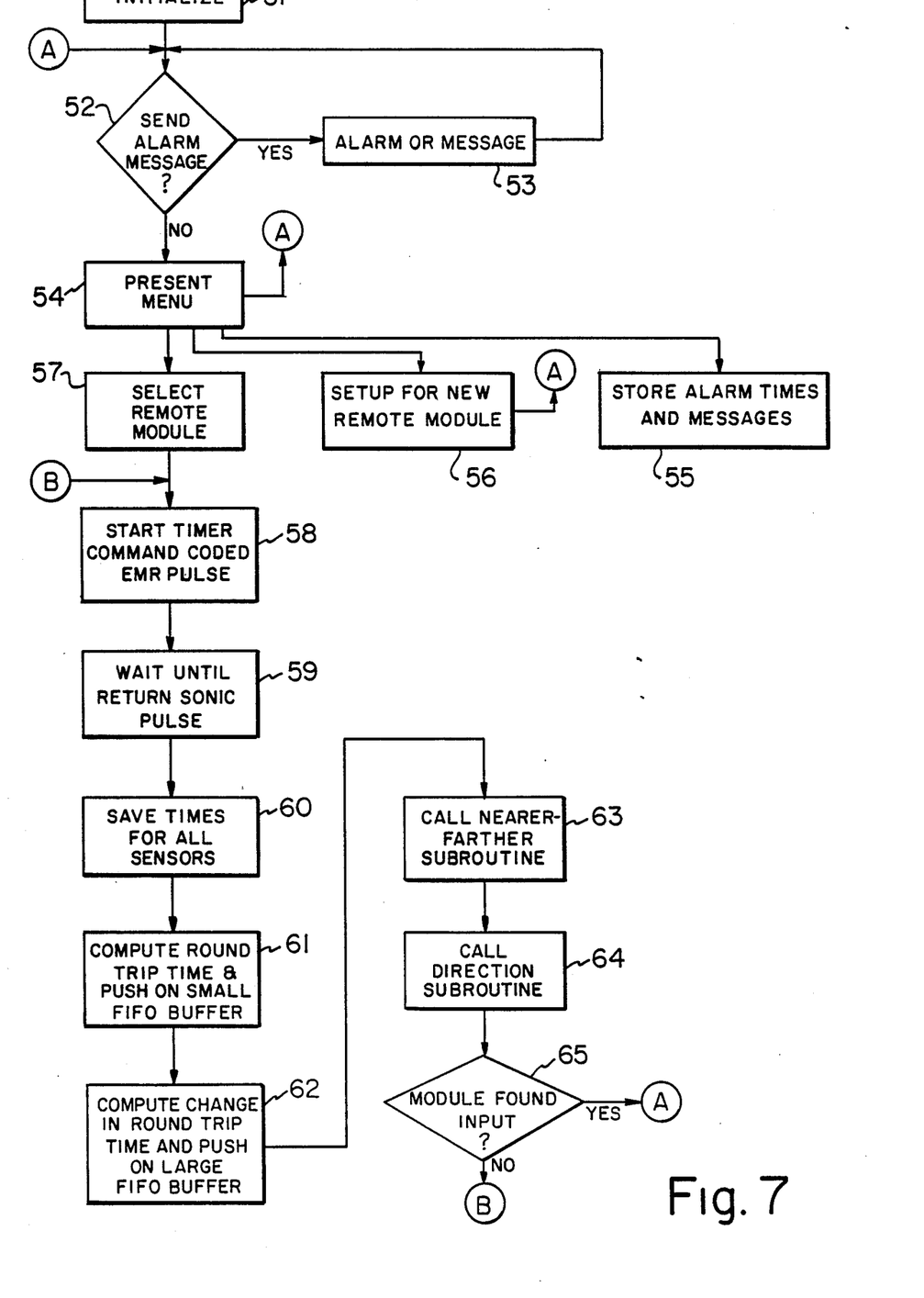
FIGS. 7, 8 and 9 illustrate in flow diagram form a computer program for being stored in the computer memory to control the operation of the homing system.

FIGS. 7, 8, and 9 are flow diagrams of one general approach to programing the computer according to this invention. The computer is initialized at 51 and the tests at 52 to see if the time has run to send an alarm or message at 53. This is accomplished by checking the time and date on a software or hardware clock associated with the computer and an alarm and message table to be discussed hereafter. If an alarm or a message is not required, the program presents the main menu at 54. If after some delay no selection is made at the main menu the program jumps back to point A. As shown, the menu has three selections. The first selection causes a jump to a routine at 55 to build the alarm and message table. The second selection causes a jump to a routine at 56 for entering a new remote module in the system by assigning a name and the correct code for the new remote module. The third selection jumps to a routine at 57 to select a remote to be located.

Once a remote module has been selected, the program moves to a routine to start a timer and to command the output of an EMR pulse coded for the selected remote module at 58. The program enters a wait loop 59 until a sonic pulse is returned. The times of the return of the response signal to each of the sensors 4a, 4b, 4c, 4d and 4e (see FIG. 1) are saved at 60. At this time the round trip time of the EMR and sonic pulses are computed and pushed onto a small FIFO buffer at 61. Next at 62 from the data in the small FIFO buffer the change in round trip time from the previous pulse sequence is calculated and the results are pushed into a larger FIFO buffer. At this time the "nearer-farther" subroutine is called at 63. Next the "direction" subroutine is called at 64. On return from the "direction" subroutine a check is made to determine if the user has signaled success at 65. If not, control loops back to point B. Otherwise, control loops back to point A.

Figure 8:
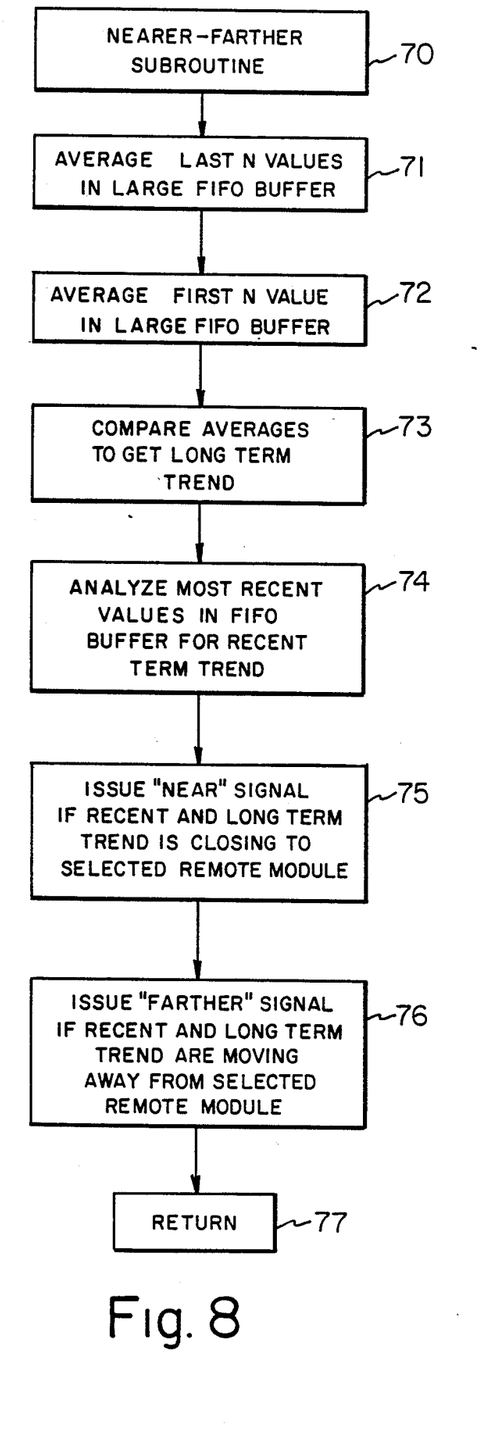

Any number of "near-farther" subroutines can be programmed. Referring to FIG. 8, one routine that considers both long term and short term progress is set forth. The averages of the last n values in the large FIFO buffer are compared to the averages of the first n values in the large FIFO buffer to establish the long term trend at 71, 72 and 73. Then the most recent values in the large FIFO buffer are analyzed at 74 to determine the recent term trend. If at 75 the long term and recent trends indicate closing with the selected remote module, then a "nearer" signal or output is commanded. If at 75 the long term and recent term trend indicate the user is moving away from the selected remote module a "father" signal or output is commanded.

The complexity of the "direction" subroutine depends upon the number of sensors. For the simple case of only two sonic transducers associated with the mobile module, it can be understood that if both sensors receive the return signal simultaneously the direction of the return signal is perpendicular to the center of an imaginary line joining the faces of both sensors. Since, the body of the user will shield the module, the fact that the signal could have approached from either of two opposite directions along the perpendicular will not cause confusion. When the time difference between the receipt of the sonic signals at the two sensors is exactly the distance between them divided by the speed of sound (the maximum possible), the return signal approaches along the imaginary line joining the faces of the two sensors. By noting which sensor first received the return signal, whether the signal approaches from the right or the left side is determined. A table can be prepared correlating direction from which signals must approach for various time differences between zero and maximum. Again the fact that the body of the user will shield the mobile module is relied upon to prevent a signal approaching from the back right quadrant from being confused with a signal approaching from the front left quadrant. If more than two sensors are used, it is not necessary to rely on the shielding of the body. The direction of approach is determined as above for two exclusive subsets of the three sensors and by comparison the quadrant from which the signal approaches is easily resolved.

Figure 9:
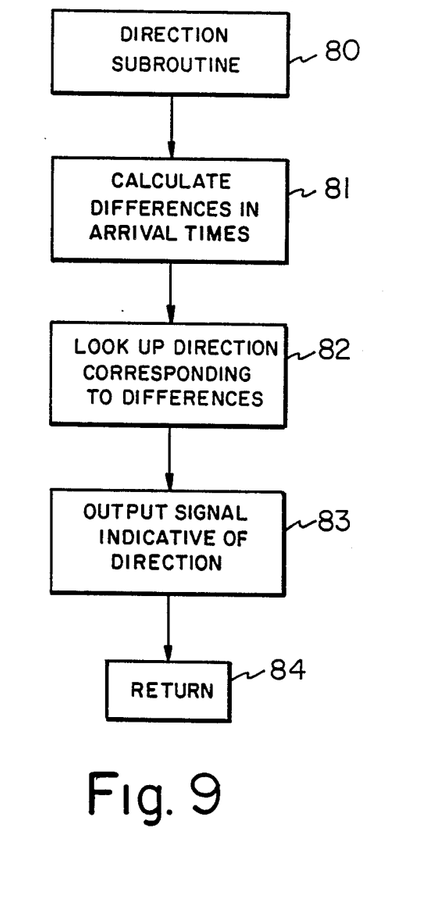

A "direction" subroutine is illustrated with reference to FIG. 9. At 81 the differences in arrival times are calculated. At 82 the direction corresponding to the time differences are looked up in a lookup table. At 82 an output signal indicative of the direction from which the return signal cam (also the direction in which the mobile module must be moved to close with the source of the return signal) is commanded.

In the case where danger modules are used, the lower frequency for the return signals must be recognized and an additional subroutine must be called to process the danger signals. In this routine the round trip time must be calculated and correlated with a distance between the danger module and the mobile module. The distance is then compared to a distance within which warnings are desired and if within the warning distance a warning is commanded.

As used herein the term sonic includes both audible and ultrasound signals.

Having thus described the invention in the detail required by the Patent Laws, what is desired protected by Letters Patent is set forth in the following claims.

What is claimed is:

1. A homing system for directing the user to one of a plurality of locations comprising:
    a plurality of remote signal processing modules for being placed at stationary locations to which the user may desire to be led comprising means for transmitting an uncoded omnidirectional sonic response signal, means for receiving a coded request signal, and means for decoding said request signal, said remote modules each responding to a unique coded request signal, and
    a mobile module comprising means for repetitively at spaced intervals transmitting coded omnidirectional EMR request signals, means for selecting a remote module by selecting the code for the omnidirectional request signals, a plurality of distinct means spaced apart and fixed to said mobile module for receiving a sonic response signal from a selected one of the plurality of remote modules initiated by each of said spaced request signals, means for generating an internal representation of the distance between the receiving means and the selected module from the time measured between the transmission of the request signal and the receipt of the response signal, means for comparing subsequent representations of the distances, means for generating an internal representation of the direction to the source of the response signal based upon the difference in the time of arrival of the response signal at said distinct means for receiving, output means indicating to the user whether the distance is increasing or decreasing continuously as the mobile module is moved and the direction to the source of the response signal, and an input means for selecting one of said remote modules based upon the unique request signal to which it responds.

2. The system according to claim 1 wherein the request signal is an infrared signal and the response signal is an ultrasonic signal.

3. The system according to claim 2 further comprising at least one repeater comprising means for receiving signals and retransmitting said signals.

4. A homing system for directing the user to one of a plurality of locations comprising:
    a plurality of remote signal processing modules for being placed at stationary locations to which the user may desire to be led comprising means for transmitting an uncoded omnidirectional sonic response signal, means for receiving a coded request signal, and means for decoding said request signal, said remote modules each responding to a unique coded request signal, and
    a mobile module comprising means for repetitively at spaced intervals transmitting coded omnidirectional EMR request signals, means for selecting a remote module by selecting the code for the omnidirectional request signals, a plurality of distinct means spaced apart and fixed to said mobile module for receiving a sonic response signal from a selected one of the plurality of remote modules initiated by each of said spaced request signals, means for generating an internal representation of the distance between the receiving means and the selected module from the time measured between the transmission of the request signal and the receipt of the response signal, means for comparing subsequent representations of the distances, means for generating an internal representation of the direction to the source of the response signal and based upon the difference in the time of arrival of the response signal at said distinct means for receiving, output means for indicating to the user the direction to the source of the response signal, and an input means for selecting one of said remote modules upon the unique request signal to which it responds.

5. The system according to claim 1 or 4 in which the mobile module further comprises a chronometer that may be set to local time and means for programing the mobile module to issue alarms at selected times and at the same time to select a remote module by selecting the code for the nondirection request signal.

6. The system according to claim 5 in which the mobile module further comprises means for programing the mobile module to issue messages at selected times.

7. The system according to claim 4 wherein the request signal is an infrared signal and the response signal is an ultrasonic signal.

8. The system according to claim 4 further comprising at least one repeater comprising means for receiving said request and response signals and transmitting said request and response signals.

* * * * *

UNITED STATES PATENT AND TRADEMARK OFFICE
CERTIFICATE OF CORRECTION

PATENT NO. : 4,935,907

DATED : June 19, 1990

INVENTOR(S) : Mark B. Friedman

It is certified that error appears in the above-identified patent and that said Letters Patent is hereby corrected as shown below:

Claim 4 Line 46 Column 10 after "modules" insert --based--.

Claim 5 Line 50 Column 10 "progaming" should read --programing--.

Signed and Sealed this

Twenty-fifth Day of June, 1991

Attest:

*Attesting Officer*

HARRY F. MANBECK, JR.

*Commissioner of Patents and Trademarks*